US012427957B2

(12) United States Patent
Plow et al.

(10) Patent No.: US 12,427,957 B2
(45) Date of Patent: Sep. 30, 2025

(54) MULTI-CIRCUIT BRAKING SYSTEM FOR BRAKE BLENDING ON AN ELECTRIC DRIVELINE EQUIPPED WITH PNEUMATIC CONTROL

(71) Applicant: Bendix Commercial Vehicle Systems LLC, Avon, OH (US)

(72) Inventors: William Plow, Avon, OH (US); Randy J. Salvatora, Columbia Station, OH (US); Jeremy Beaulieu, High Point, NC (US); John V. Ripley, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 799 days.

(21) Appl. No.: 17/732,001

(22) Filed: Apr. 28, 2022

(65) Prior Publication Data
US 2023/0347855 A1 Nov. 2, 2023

(51) Int. Cl.
*B60T 8/34* (2006.01)
*B60T 8/1761* (2006.01)
*B60T 8/40* (2006.01)
*B60T 13/68* (2006.01)
*B60T 13/74* (2006.01)

(52) U.S. Cl.
CPC ............ *B60T 8/342* (2013.01); *B60T 8/1761* (2013.01); *B60T 8/349* (2013.01); *B60T 8/4072* (2013.01); *B60T 13/683* (2013.01); *B60T 13/746* (2013.01); *B60T 2220/04* (2013.01); *B60T 2270/602* (2013.01)

(58) Field of Classification Search
CPC ........ B60T 8/342; B60T 8/349; B60T 8/1761; B60T 8/4072; B60T 13/683; B60T 13/746
See application file for complete search history.

(56) References Cited

U.S. PATENT DOCUMENTS

| 5,927,829 | A | * | 7/1999 | Saga | ............. | B60T 8/448 |
| | | | | | | 180/165 |
| 7,370,917 | B2 | | 5/2008 | Battistella et al. | | |
| 8,493,196 | B2 | | 7/2013 | Pandy | | |
| 8,838,356 | B2 | | 9/2014 | Mederer et al. | | |
| 8,977,467 | B2 | | 3/2015 | Herges et al. | | |
| 10,029,660 | B2 | | 7/2018 | Buchner et al. | | |

(Continued)

FOREIGN PATENT DOCUMENTS

| EP | 2783928 A1 | 10/2014 |
| EP | 3018020 A2 | 5/2016 |

(Continued)

OTHER PUBLICATIONS

Bendix® AT-3™ Solenoid Valves Installation Instructions; S-1521; Bendix Commercial Vehicle Systems LLC; Apr. 2009; 2 pages.

*Primary Examiner* — Vishal R Sahni
(74) *Attorney, Agent, or Firm* — Crowell & Moring LLP (57) ABSTRACT

A brake controller determines if an amount of regenerative braking needed to achieve a requested deceleration will exceed a driveline capability of a tractor. If it will, the brake controller redistributes some of the requested deceleration to a braking system of a trailer. That way, the requested deceleration can be achieved by the combination of regenerative braking of the tractor and the braking system of the trailer. Other braking mechanism(s) of the tractor can also be used, if needed.

20 Claims, 11 Drawing Sheets

(56) References Cited

U.S. PATENT DOCUMENTS

| | | | |
|---|---|---|---|
| 10,173,668 B2 | 1/2019 | Macnamara et al. | |
| 10,272,889 B2 | 4/2019 | Finkl et al. | |
| 2010/0125398 A1* | 5/2010 | Headlee | B60T 13/586 |
| | | | 180/65.265 |
| 2012/0319464 A1* | 12/2012 | Lloyd | B60T 17/22 |
| | | | 303/3 |
| 2015/0375728 A1* | 12/2015 | Kuhlman | B60T 13/147 |
| | | | 303/9.61 |
| 2018/0111591 A1 | 4/2018 | Fry et al. | |
| 2018/0126968 A1* | 5/2018 | Eckert | B60T 8/323 |
| 2018/0361856 A1* | 12/2018 | Zhao | B60W 10/02 |
| 2020/0156643 A1* | 5/2020 | Hu | F02D 41/0007 |
| 2021/0261106 A1* | 8/2021 | Yamamoto | B60T 8/1761 |
| 2022/0348087 A1* | 11/2022 | Yokoo | B60T 1/10 |
| 2023/0063325 A1* | 3/2023 | Lee | B60T 13/74 |
| 2023/0347855 A1* | 11/2023 | Plow | B60T 8/349 |

FOREIGN PATENT DOCUMENTS

| | | |
|---|---|---|
| EP | 3290280 A1 | 3/2018 |
| GB | 2499651 A | 8/2013 |
| GB | 2535530 A | 8/2016 |
| GB | 2535532 A | 8/2016 |
| WO | WO 2016/169966 A1 | 10/2016 |
| WO | WO 2016/169967 A1 | 10/2016 |
| WO | WO 2017/121597 A1 | 7/2017 |

\* cited by examiner

MULTI-CIRCUIT BRAKING SYSTEM FOR BRAKE BLENDING ON AN ELECTRIC DRIVELINE EQUIPPED WITH PNEUMATIC CONTROL

BACKGROUND

Today's heavy-duty commercial vehicles configured for towing (a "tractor") are normally designed with two isolated braking circuits providing control of a steer axle (or steer axle group) and a rear axle (or rear axle group). Protected and isolated supply and control air signals can be provided from both circuits to a towed vehicle (a "trailer"). The braking control signal to the trailer is normally the higher of the signals from the two isolated circuits. This provides safe, stable stopping forces from all axles and wheel ends on both the tractor and the trailer.

SUMMARY

The following embodiments generally relate to a multi-circuit braking system for brake blending on an electric driveline equipped with pneumatic control. In one embodiment, a braking control system is provided comprising: a valve configured to receive pneumatic fluid, and a processor in communication with the valve. The processor is configured to: receive a deceleration signal generated by movement of a pedal of a tractor having a driveline, wherein the deceleration signal represents a requested deceleration; determine whether using regenerative braking to achieve the requested deceleration will exceed a driveline capability of the tractor (and/or the wheels of the driven axle(s)); and in response to determining that using regenerative braking to achieve the requested deceleration will exceed the driveline capability of the tractor: cause regenerative braking to be applied in an amount that does not exceed the driveline capability of the tractor; and activate the valve to allow at least some of the pneumatic fluid to be sent to a braking system of a trailer towed by the tractor as an additional braking circuit (and/or the axle(s) of the tractor as calculated and prioritized by a brake blending algorithm).

In another embodiment, a method is provided that is performed in a controller of a towing vehicle that is coupled with a towed vehicle. The method comprises: receiving a signal requesting deceleration; determining whether an amount of regenerative braking needed to be applied by an electric driveline of the towing vehicle to achieve the requested deceleration exceeds a maximum deceleration capability of the driveline; and in response to determining that the amount of regenerative braking needed to be applied exceeds the maximum deceleration capability of the driveline: causing the electric driveline to apply regenerative braking on at least one axle in an amount less than the maximum deceleration capability of the driveline; and implementing deceleration of the towed vehicle as an additional source of deceleration of a combination of the towing vehicle and towed vehicle.

In yet another embodiment, a system for a multi-axle vehicle is provided comprising: an electric motor configured to perform regenerative braking to decelerate a multi-axle vehicle; and means for distributing a braking request between the electric motor and an additional braking circuit to manage wheel slip caused by the electric motor in performing regenerative braking through the use of the additional braking circuit.

Other embodiments are possible, and each of the embodiments can be used alone or together in combination.

DETAILED DESCRIPTION

The embodiments provided below can be used distribute a braking request between an electric motor of a driveline of a tractor and a braking system of a trailer. In one embodiment, a three-circuit pneumatic braking system is used to re-distribute the braking request. Before turning to a description of an example of a three-circuit pneumatic braking system, the following paragraphs provide a description of a two-circuit pneumatic braking system for context. It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

Figure 1:
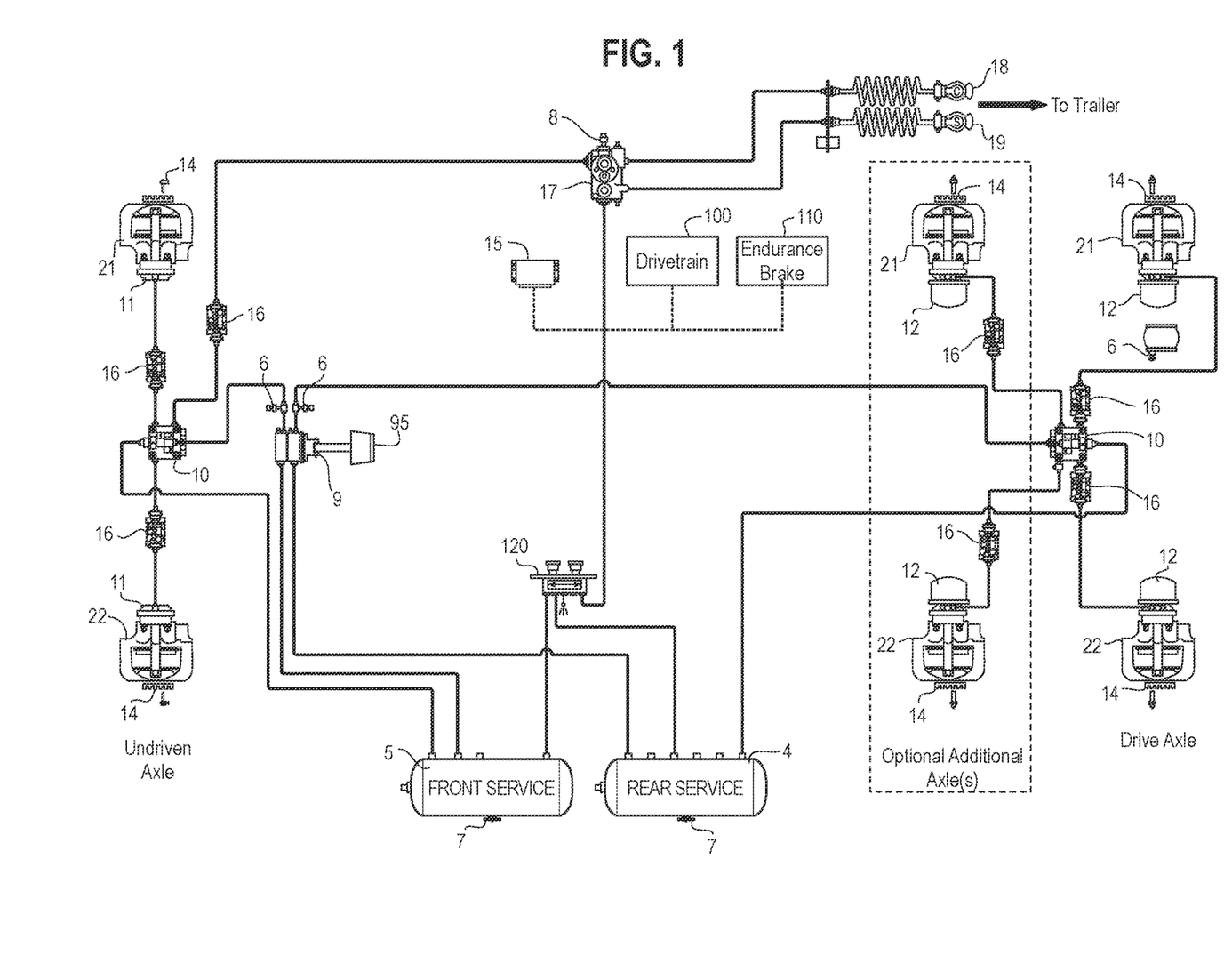
FIG. 1 is a diagram of a braking system of an embodiment comprising a pneumatic braking design for a tractor.

Turning now to the drawings, FIG. 1 is a diagram of a braking system of a tractor of an embodiment. As shown in FIG. 1, in this embodiment, the tractor has a rear drive axle, a front undriven (steer) axle, and one or more optional axles. The rear drive axle is driven by a drivetrain, represented by drivetrain controller 100, with an electric motor. The drivetrain 100, which can be controlled by (micro-)processor(s), can take any suitable form and can include one or more of the following components: electric motor(s), batteries, transmission(s), differential(s), locking differential(s), and other such gear sets capable of changing rotational speeds. The number and location(s) of the electric motor(s) in the drivetrain 100 can be selected in any suitable manner. For example, the tractor can have a single central motor coupled with the drive axle, a single motor per axle on a single axles or multiple driven axles in a rear axle group, a plurality of motors per axle on a single axle or multiple driven axles in the rear axle group, a single motor per axle on a single axle or multiple driven axles in a steer axle group, or a plurality of motors per axle on a single axle or multiple driven axles in the steer axle group. Other configurations are possible.

The drive, undriven, and optional axles have various components that can be used to decelerate the tractor. As shown in FIG. 1, in this embodiment, the drive, undriven, and optional axles each comprise a traction relay valve 10, a service brake actuator 11 on each braked wheel end, a parking brake actuator 12 on the driven axle(s), at least one wheel speed sensor 14, at least one anti-lock brake modulator 16, and friction brakes, such as an air disc caliper 21, 22 on each braked wheel end. In operation, when a driver presses the brake pedal 95, a dual-circuit foot valve 9 receives pneumatic pressure from a primary reservoir 4 and a secondary reservoir 5 (each having a respective manual drain valve 7). The secondary reservoir 5 provides a proportional pneumatic pressure to the braking component of the undriven axle through the foot valve 9, while the primary reservoir 4 provides a proportional pneumatic pressure to the braking component of the driven axle and optional axle(s), if present through the foot valve 9. These proportional supplies of air are controlled by the driver's press on the pedal. The pressure sensor 6 measure pressure at the control lines from the foot valve 9. Accordingly, the braking system of the tractor of this embodiment has two isolated braking circuits: one providing braking of the drive axle and optional axle(s) in the rear axle group and another providing braking in the steer axle of front axle group. Either brake circuit can provide braking to the trailer.

In this embodiment, a control unit 15 is provided that is configured to control various braking and stability systems in the tractor, such as, but not limited to, an anti-lock brake system (ABS), an electronic stability system, an automatic traction control system, and a drag torque control system. Although not shown in FIG. 1 to simplify the drawing, the control unit 15 can produce and consume signals to/from other processors in the tractor. For example, inputs can be provided from sensors including, but are not limited to, the pressure sensor 6, the wheel speed sensors 14, the steer angle sensors 32, the yaw rate sensors 33, and axle sensors. The tractor also has an endurance brake system, depicted by the endurance brake controller 110, which is capable of causing deceleration by physically limiting the rotational force of the drivetrain's components. Generally speaking, the solid lines in FIG. 1 show a pneumatic signal path, and the dashed lines show an electrical signal path. As noted above, other configurations can be used.

The tractor can be used to tow a trailer, which has its own braking system that is also controlled by the brake pedal 95 of the tractor. The trailer's braking system can take any suitable form, including, but not limited to, a pure pneumatic braking system, an electro-pneumatic braking system signaled with air or electronic signals for braking requests, and a regenerative braking system signaled with air or electronic signals for braking requests (the regenerative braking system can optionally also provide acceleration). In the embodiment shown in FIG. 1, the trailer's braking system is a pure pneumatic braking system, and a multiplexor valve 120 provides the greater of the pneumatic pressures from the primary and secondary reservoirs 4, 5 to a tractor protection valve 17. The tractor protection valve 17 provides protected and isolated supply and control air signals to a trailer control coupling 18 and a trailer supply coupling 19. The pneumatic pressure is also supplied to a stop light switch 8 to illuminate a brake light.

The braking system in FIG. 1 provides safe, stable stopping forces from all axles and wheel ends on both the tractor and the trailer. However, a problem can occur when the drivetrain 100 has an electric motor used to provide regenerative braking. In general, it is desirable to perform the maximum amount of energy recuperation through regenerative braking of the drive axle(s). The maximum energy recuperation is achieved by using only the driven axle(s), which can account for only 20-40% of the braking force of certain tractor-trailer combinations. This leaves the trailer unbraked and increases the risk of instability of the tractor-trailer combination. For example, a trailer can potentially outweigh the tractor by a factor of 3 to 1, so an unbraked trailer can potentially push the tractor even as the tractor is braking. To address this issue, the tractor can limit the regenerative capability of the drivetrain 100 to ensure that wheels on the driven axle will not slip. If wheel slip occurs, the regenerative capability can be reduced or even disabled, and braking of the tractor can be performed entirely by the pneumatic braking system.

The following embodiment provides another solution to this problem that allows the regenerative braking to be used in some capacity rather than completely disabling it. More specifically, in one embodiment, a tractor is provided with a brake controller that can distribute a braking request between an electric motor of the tractor (to provide regenerative braking) and a braking system of the trailer (and possibility to other braking elements of the tractor). This is illustrated in the flow chart 200 of FIG. 2.

Figure 2:
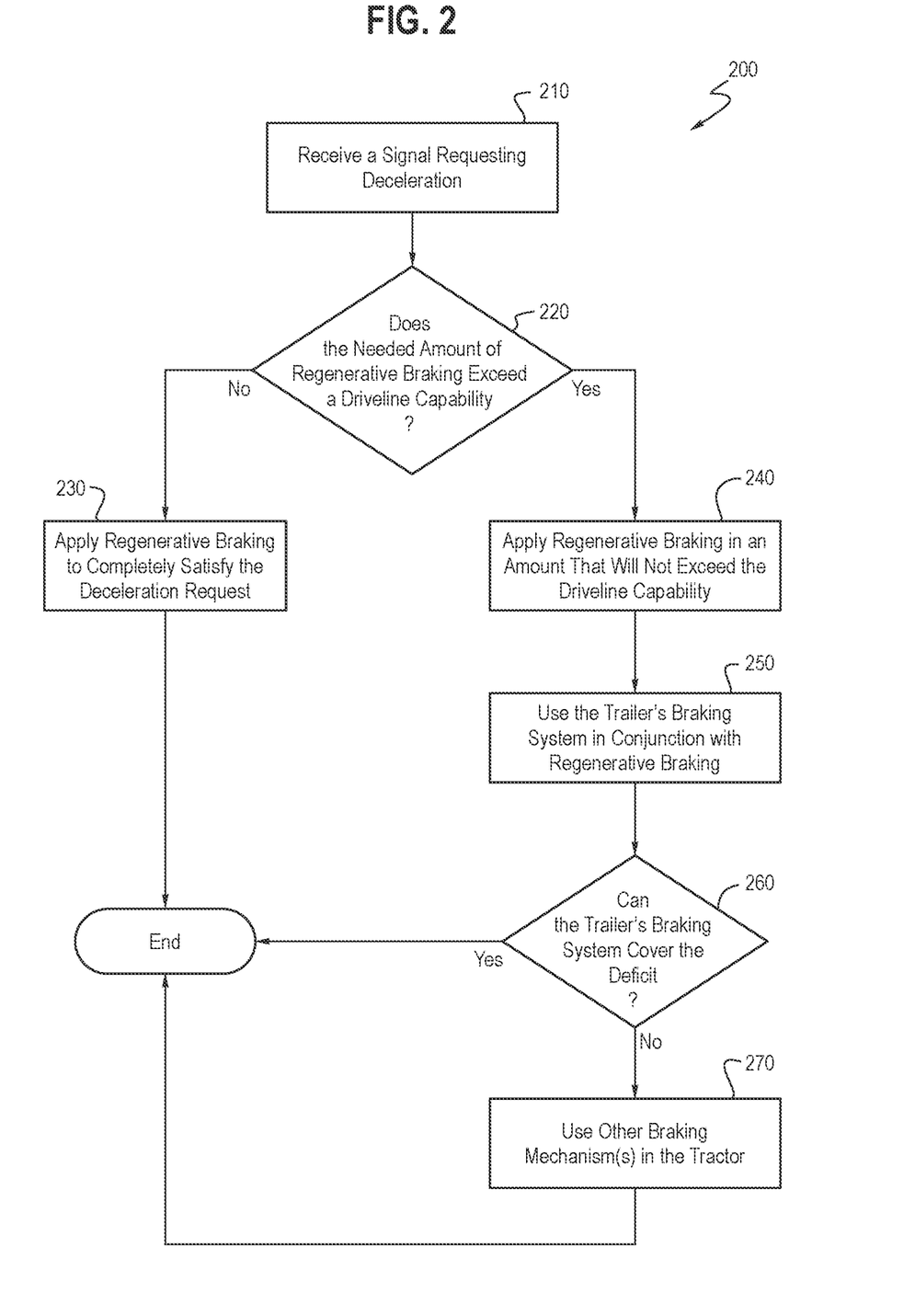
FIG. 2 is a flow chart of a method of an embodiment for brake blending between a braking system of a tractor and a braking system of a trailer.

As shown in FIG. 2, in one embodiment, the braking controller (which can comprise a processor) receives a signal requesting deceleration (act 210) and determines if the amount of regenerative braking needed to achieve the requested deceleration exceeds a driveline capability of the tractor (act 220). As used herein, "driveline capability" refers to the capability of one or more of the various components in the driveline to provide controlled braking. For example, the braking controller can determine whether the amount of regenerative braking needed to achieve the requested deceleration will exceed a maximum braking force of the drive axle. As another example, the braking controller can determine whether the amount of regenerative braking needed to achieve the requested deceleration will cause a wheel slip, which is a condition in which the braking force applied to the wheel exceeds the traction available to that wheel.

If the braking controller determines that the amount of regenerative braking needed to achieve the requested deceleration does not exceed the driveline capability of the tractor, the braking controller can cause the electric motor to apply regenerative braking to decelerate the vehicle as requested (act 230). However, if the braking controller determines that the amount of regenerative braking needed to achieve the requested deceleration exceeds the driveline capability of the tractor, the braking controller can cause the electric motor to apply regenerative braking in an amount that will not exceed the driveline capability (act 240) and distribute some or all of the "overage" of the braking request to the trailer's braking system to attempt to make-up for the deficit (act 250). The braking controller then determines if the trailer's braking system can make up the entire deficit (act 260). If the trailer's braking system is incapable of making-up the entire deficit, the braking controller can cause other braking mechanism(s) in the tractor to provide the remaining deceleration needed (act 270). For example, the braking system can apply a friction brake to a non-driven axle of the tractor, then (if needed) apply an endurance brake to the electric motor, and then (if needed) apply a friction brake to the driven axle of the tractor.

In this way, the braking system of this embodiment can be considered a three-circuit braking system. That is, unlike the two-circuit braking system shown in FIG. 1 (one circuit for the drive and optional axle(s) and another circuit for the undriven axle), this embodiment has a third independent circuit for the trailer's braking system. By using these three circuits for "brake blending," regenerative braking can be used to provide some of the deceleration, with trailer braking and other tractor braking (if necessary) used to achieve the total requested deceleration. With the embodiment, the regenerative capacity of the drivetrain becomes a constant and uninhibited feature of the vehicle. With the equation for work being Work=Force×Distance, work performed and recuperated by the driveline can be maintained for the total distance of the deceleration. This provide advantages over the approach mentioned above in which the regenerative capability is disabled completely.

These embodiments can be implemented in any suitable way. The following paragraphs provide examples of several possible implementations. It should be noted that other implementations can be used and that none of the details in these examples should be read into the claims unless expressly recited therein.

Figure 3:
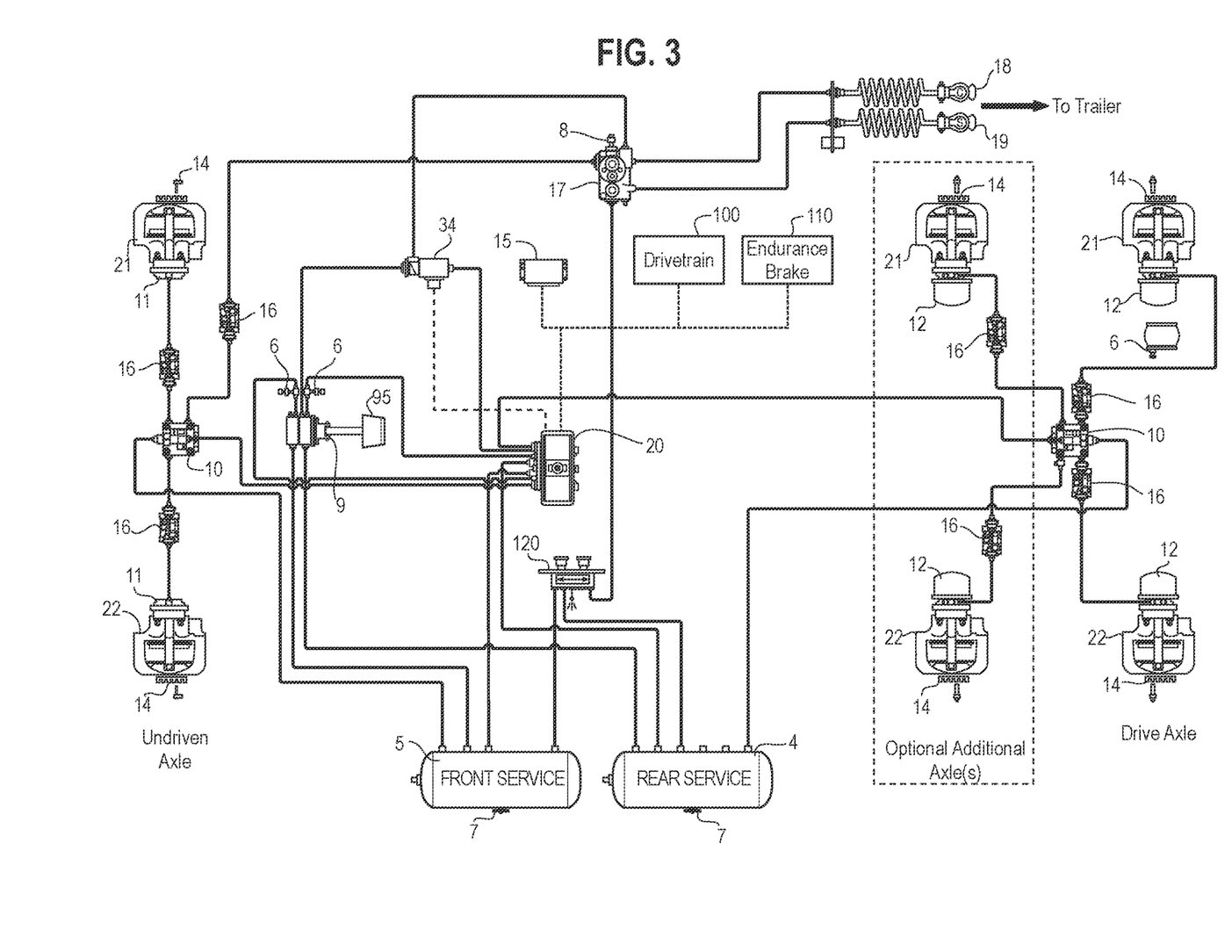
FIG. 3 is a diagram of a braking system of an embodiment comprising a solenoid-controlled valve to distribute a braking request between the braking system of the tractor and a braking system of a trailer.

Turning again to the drawings, FIG. 3 is an illustration of one example implementation. Most of the components in FIG. 3 are the same as those in FIG. 1 and will not re-explained here for brevity. However, some of the new component in the braking system shown in FIG. 3 are a braking controller 20 (which is sometime referred to herein as a dual-circuit electro-pneumatic control module) and a valve 34. The braking controller 20 is in series with the foot brake valve 9 and monitors the driver's request for braking by observing the pressure in the control lines of the primary and secondary circuits. The braking controller 20 is configured to monitor and react to the driver's request and environmental conditions of the tractor-trailer combination to calculate and prioritize the deceleration requests between the braking system of the trailer and the various braking components of the tractor. In this embodiment, the valve 34 is used by the braking controller 20 to control communication of pneumatic pressure generated by the application of the brake 95 to the brake system of the trailer. In the embodiment shown in FIG. 2, the valve 34 takes the form of a three-port, two-state (3/2) solenoid-controlled valve (here, a Bendix® AT-3™ solenoid valve, although other types of solenoid-controlled valves can be used). However, valves other than a solenoid-controlled valve can be used, and an example of one such other valve is described in an alternate embodiment below.

The braking controller 20 can take the form of a (micro-)processor that executes computer-readable program code (e.g., firmware) stored in a computer-readable medium (e.g., in the braking controller 20 or in another location). The braking controller 20 can also take the form of a pure-hardware configuration using processing circuitry, logic gates, switches, an application-specific integrated circuit (ASIC), or a programmable logic controller, for example. This configuration will also be referred to as a processor. The firmware and/or hardware of the braking controller 20 can be configured to perform the various functions described below and shown in the flow diagrams. Also, while the braking controller 20 is shown as separate from the control unit 15 in this embodiment (the braking controller 20 and the control unit 15 can communicate with each other), in other embodiments, some or all of the functions of the control unit 15 can be implemented in the braking controller 20, or vice versa. Further, the braking controller 20 can be on or off the vehicle.

Figure 4:
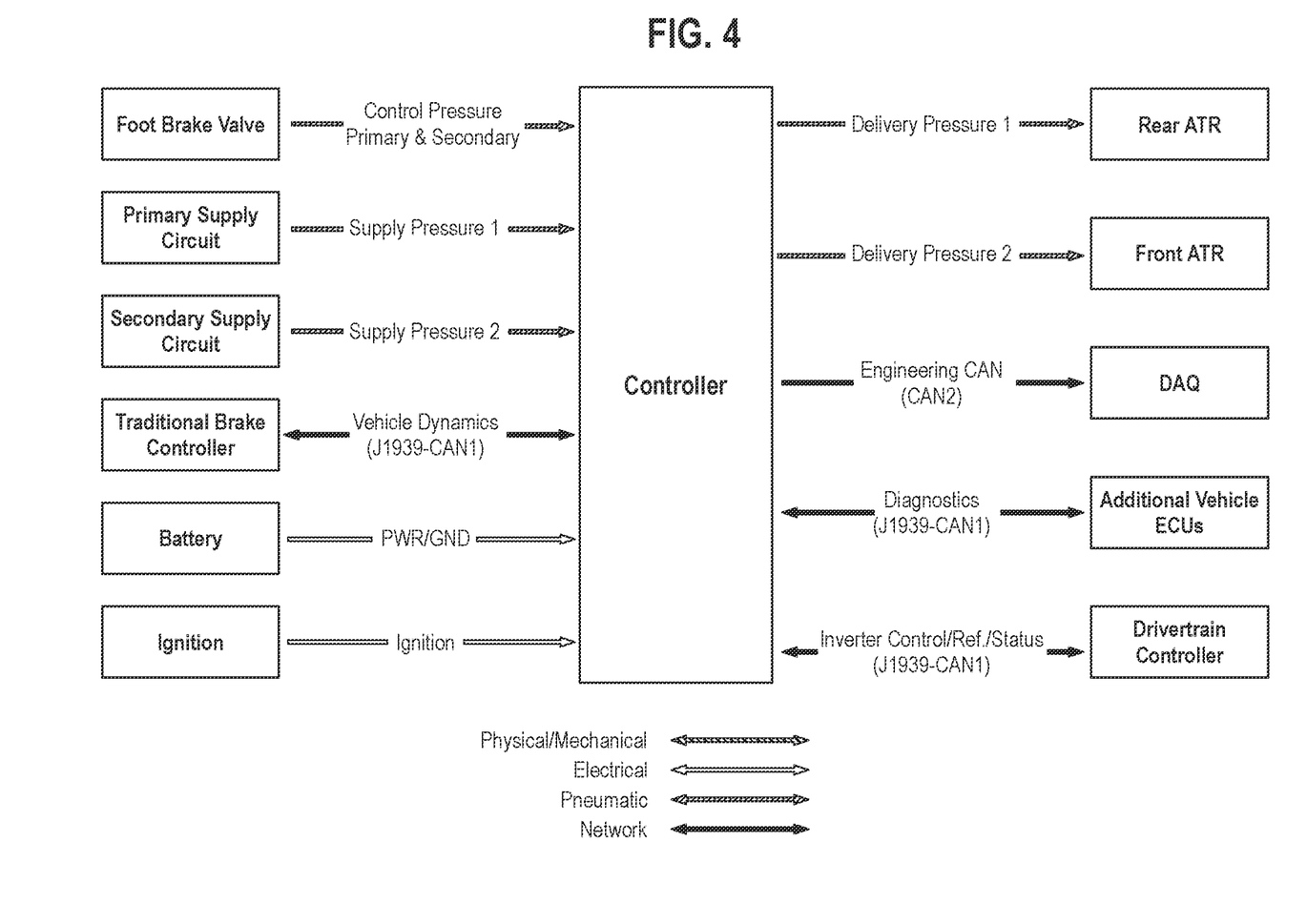
FIG. 4 is a block diagram of a braking controller of an embodiment.

FIG. 4 is a block diagram of an example implementation of the braking controller 20 of an embodiment. This is just an example, and other implementations can be used. As shown in FIG. 4, in this embodiment, the braking controller 20 has various physical/mechanical, electrical, pneumatic, and network input and outputs. For example, a foot brake valve provides primary and secondary control pressure inputs to the braking controller 20, and primary and secondary supply circuits supply respective pressure to the braking controller 20. A battery provides continuous power and ground, for example, 12 volts, and an ignition provides an ignition voltage when the vehicle ignition is engaged. Two-way network communication is provided between the braking controller 20 and a traditional brake controller, drive train controller, and additional ECUs. Further, the braking controller 20 provides delivery pressure to rear and front ATRs. Other inputs and/or outputs not shown can be used.

In operation, the braking controller 20 receives a pneumatic signal from the pedal 95, which represents a requested deceleration. The braking controller 20 then determines whether using regenerative braking to achieve the requested deceleration will exceed a driveline capability of the tractor. The braking controller 20 can make this determination in any suitable way. For example, the braking controller 20 can consider one or more of the following factors: weight of the vehicle; weight of an axle load; model of the vehicle; dimensions of the vehicle; engine, transmission, and wheel speed measurements and observations; pressure sensor readings; movement of the pedal; wheel speeds; status of brake controller functions; status of drivetrain functions and capabilities; and status of endurance brake functions and capabilities.

If the braking controller 20 determines that using regenerative braking will not exceed the driveline capability, the braking controller 20 can instruct the electric motor(s) in the drivetrain 100 to apply regenerative braking to achieve the requested deceleration. However, if the braking controller 20 determines that using regenerative braking will exceed the driveline capability, the braking controller 20 will cause brake blending to occur between the regenerative braking system and the braking system of the trailer (and potentially with the other braking mechanisms of the tractor).

More specifically, the braking controller 20 can communicate with the electric motor(s) of the drivetrain to cause regenerative braking to be applied in an amount that does not exceed the driveline capability of the tractor. The braking controller 20 can also cause the valve 34 to allow at least some of the pneumatic signal to be sent to a braking system of a trailer to make up for any deceleration deficit. (In some embodiments, the valve 34 is either on or off, allowing 100% or 0% signal to flow. In other embodiments, the valve 34 is adjustable between 0 and 100% (e.g., to allow 10% signal to flow).) The result is a "brake blending" situation, in which part of the requested deceleration is provided by regenerative braking, and another part of the requested deceleration is provided by the braking system of the trailer.

Figure 5:
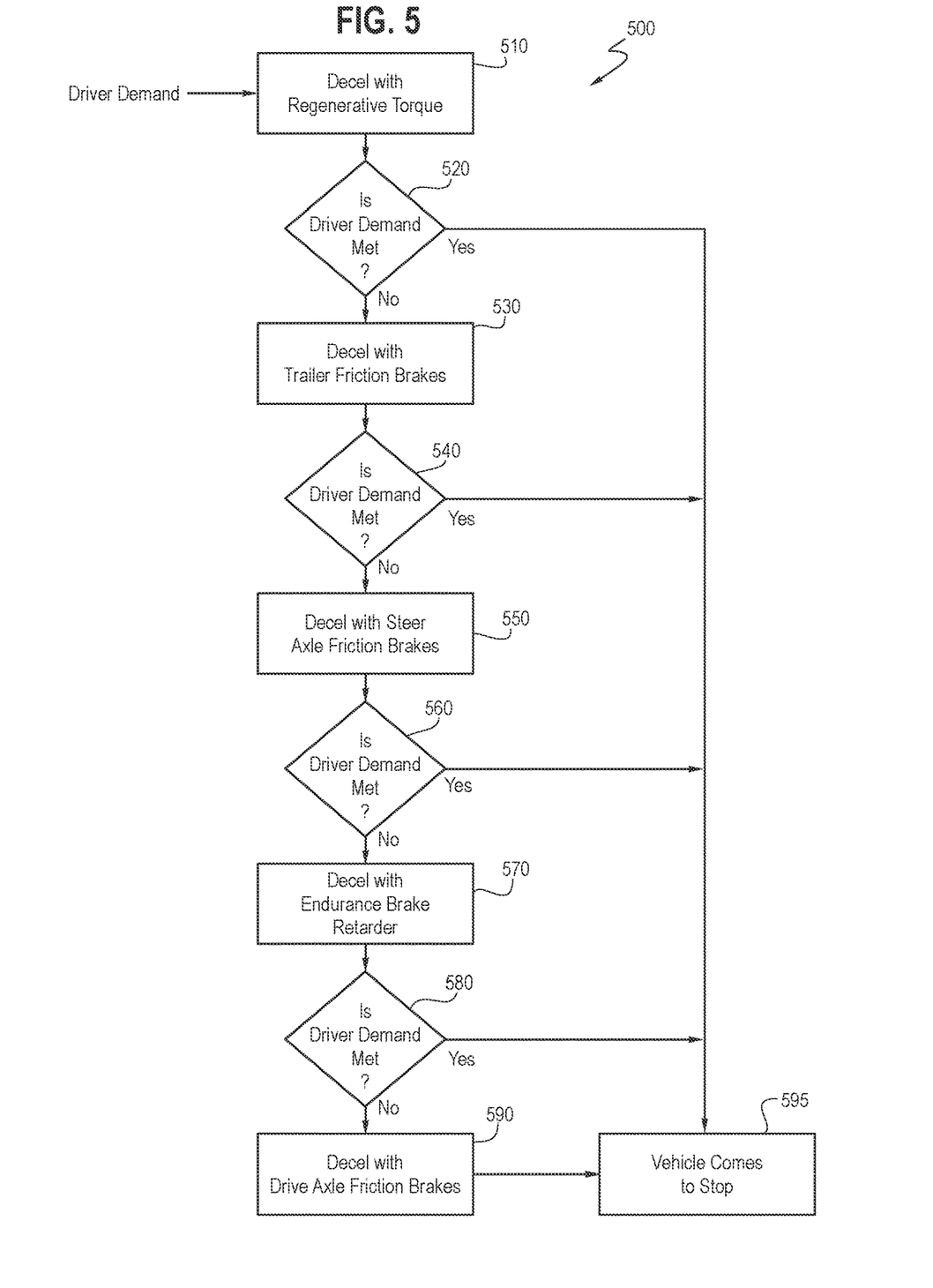
FIG. 5 is a flow chart of a method of an embodiment for prioritizing distribution of a requested deceleration.
Figure 6A:
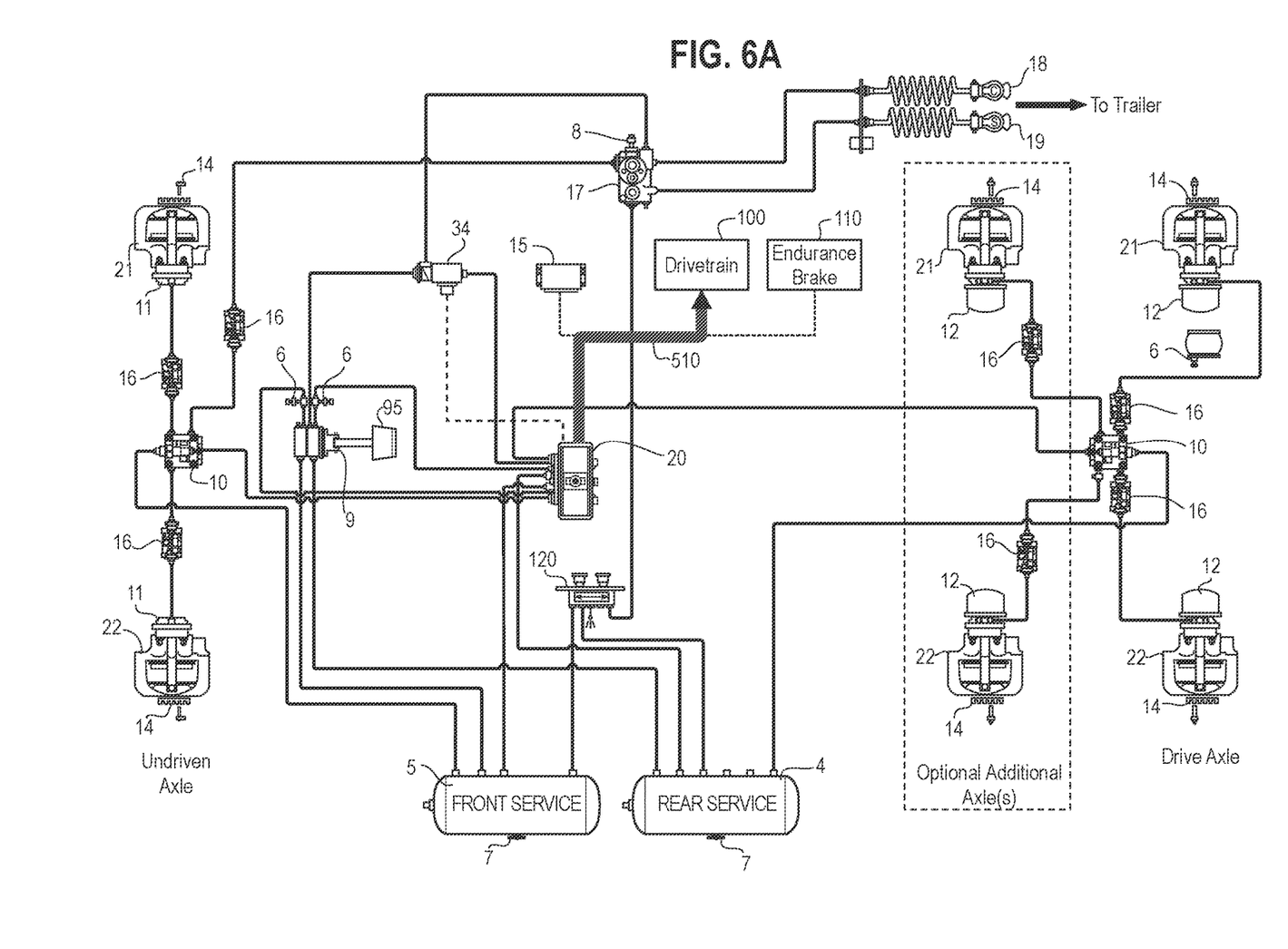
FIGS. 6A-6E are flow diagrams illustrating various braking priorities of an embodiment.
Figure 6B:
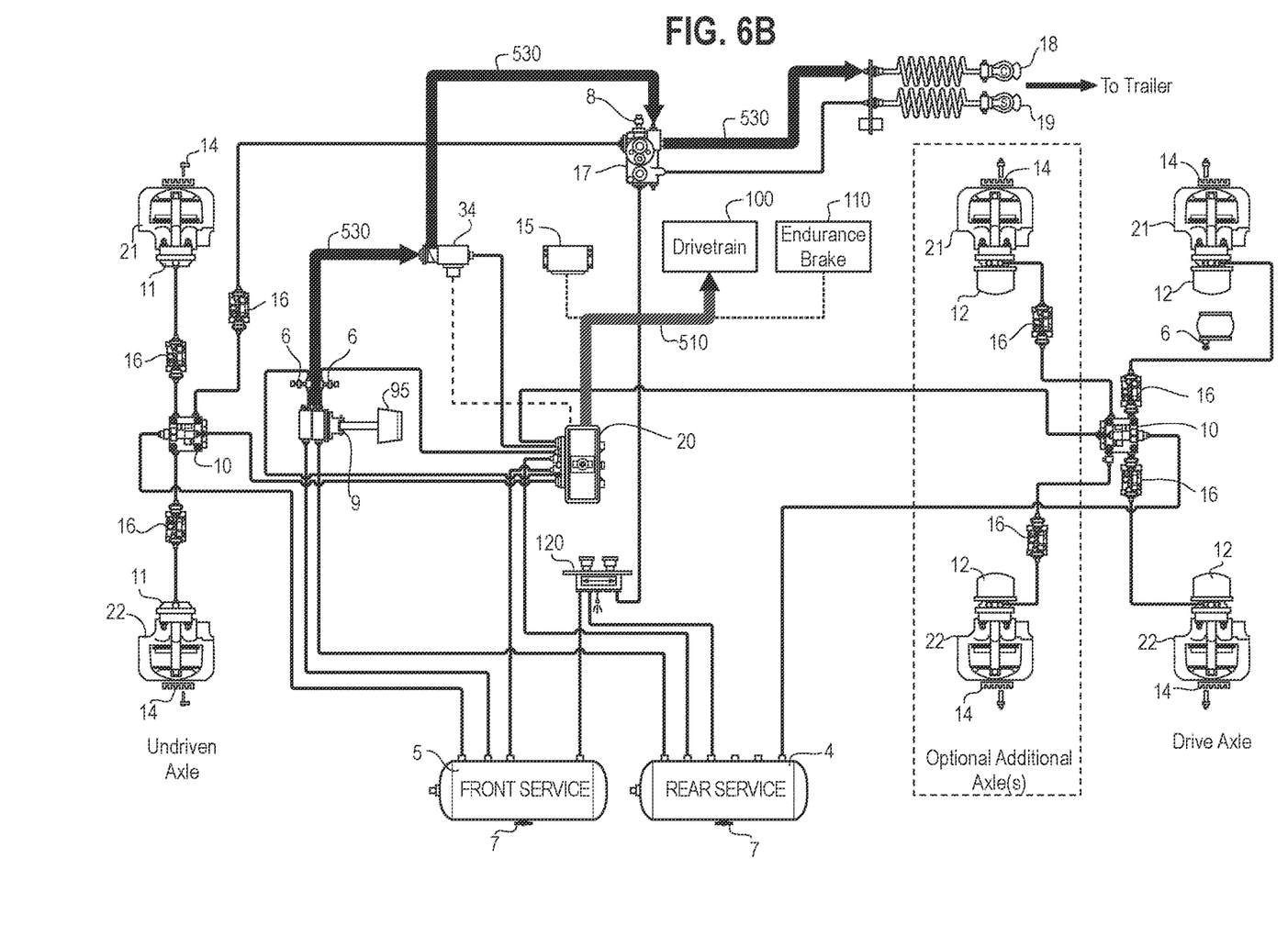
Figure 6C:
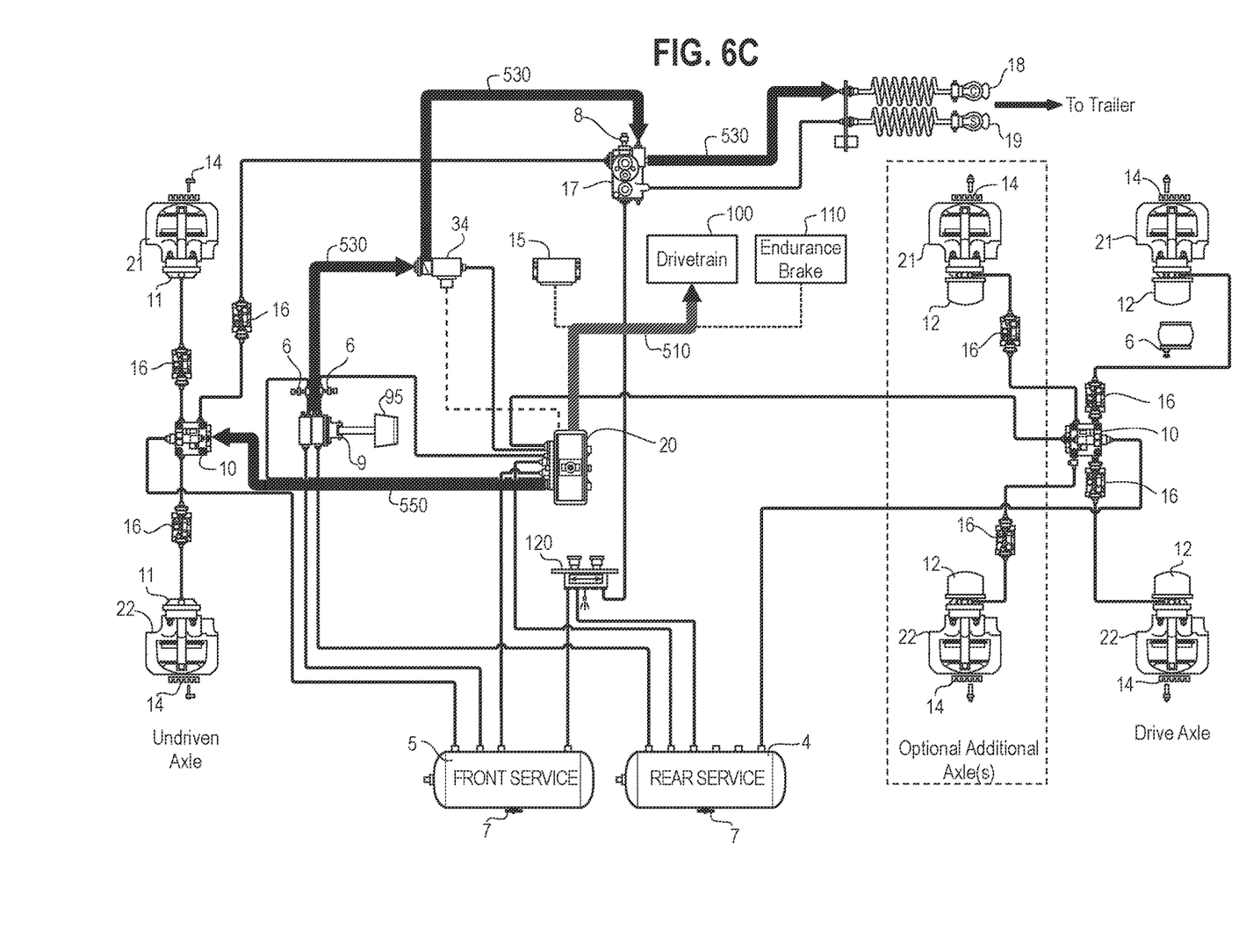
Figure 6D:
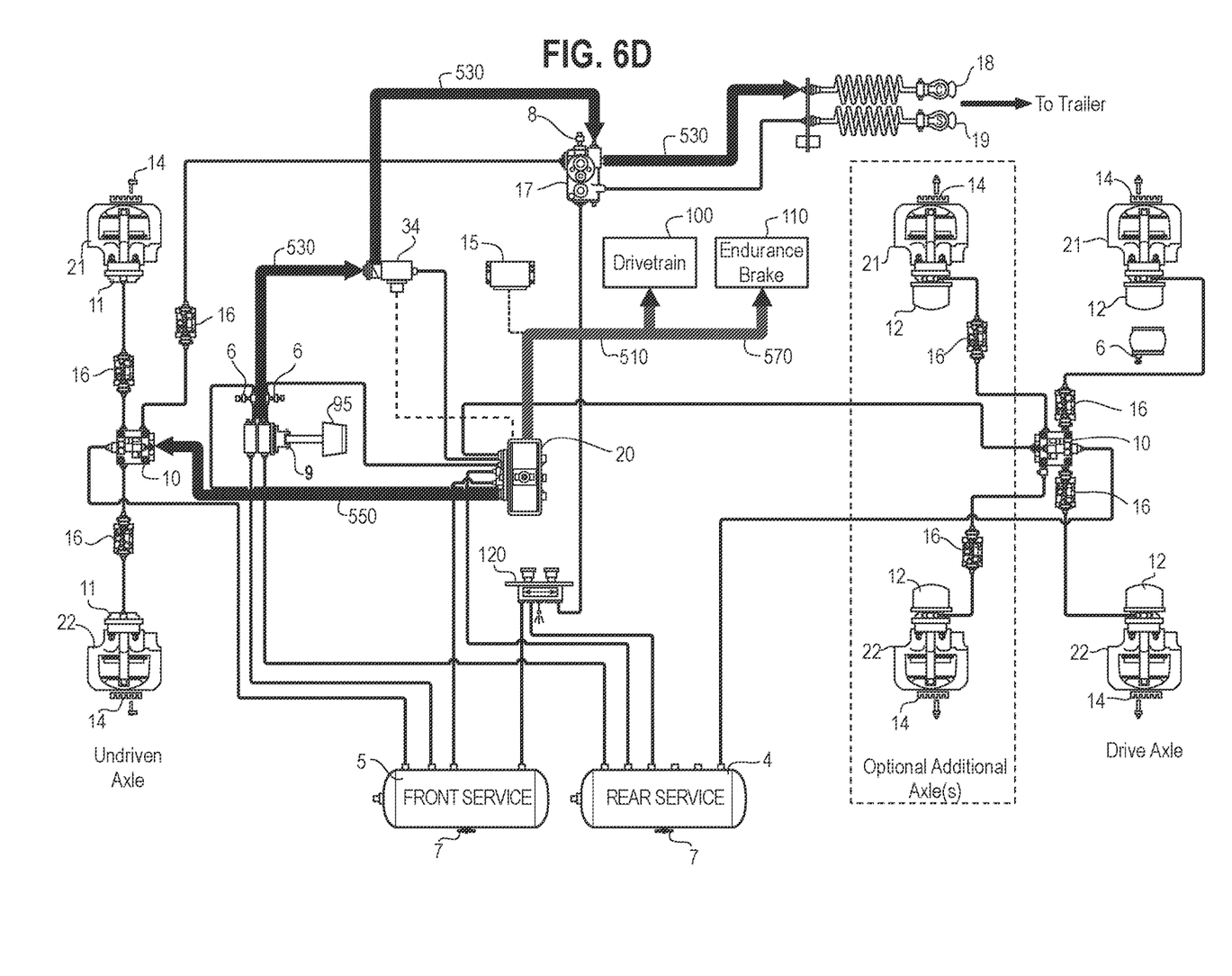
Figure 6E:
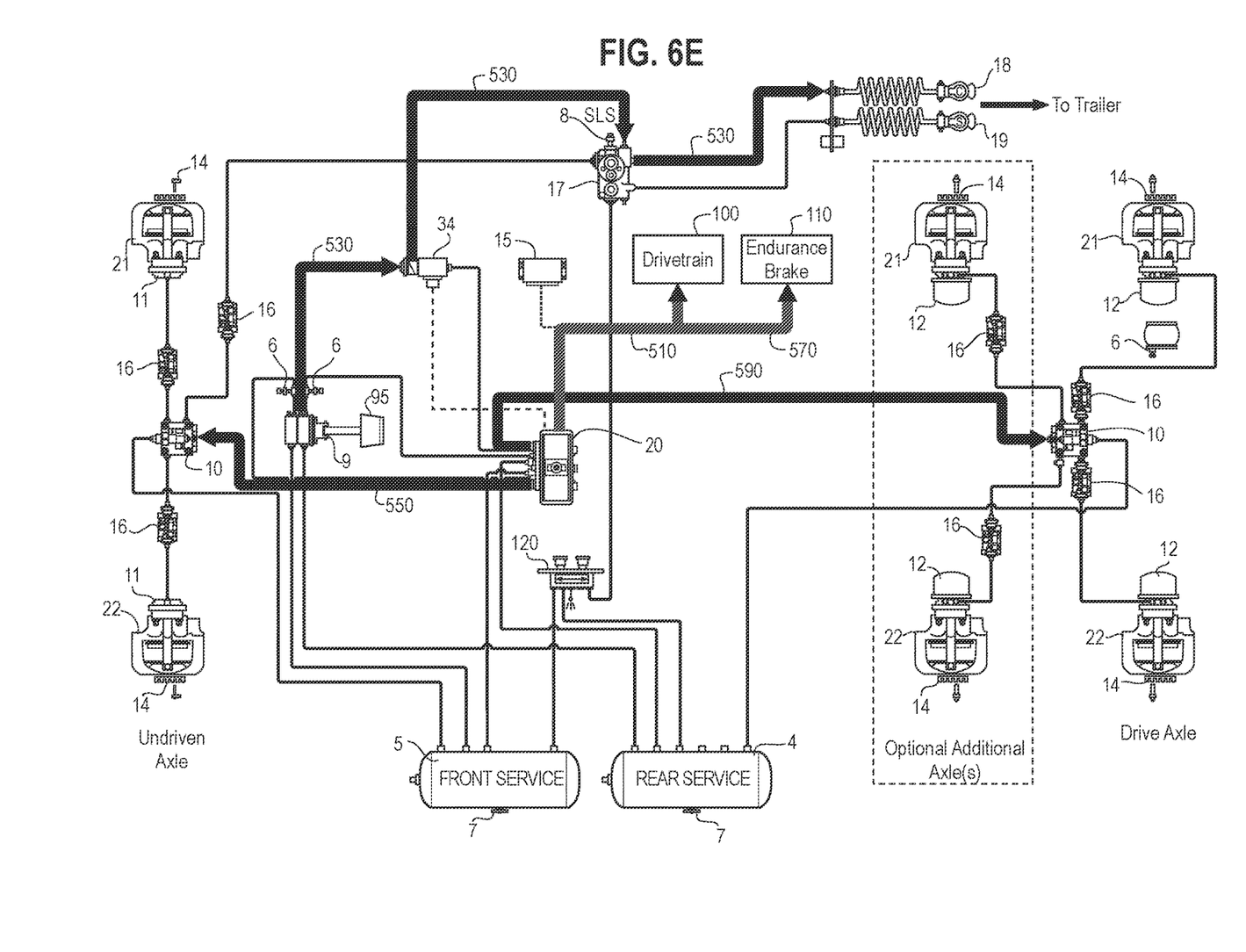

As mentioned above, it is possible that the combined deceleration provided by regenerative braking and the braking system of the trailer will be insufficient to achieve the requested deceleration. In this situation, the braking controller 20 can use one or more different braking mechanisms in the tractor to provide the missing deceleration. The braking controller 20 can be configured with a priority in which these various braking mechanisms are applied. FIG. 5 is a flow chart 500 that illustrates an example of this priority process, and FIGS. 6A-6E illustrate flow paths of each of the priority stages.

As shown in FIG. 5, regenerative braking is applied via communications with the drivetrain 100, and after deceleration with regenerative torque is applied (act 510), the braking controller 20 determines if the driver's deceleration demand has been met (act 520). If the driver's deceleration demand has not been met, the braking controller 20 applies deceleration with the trailer's braking system (here, with friction brakes via a pneumatic or electronic signal to the trailer brake circuit) (act 530). The braking controller 20 then determines if the driver's deceleration demand has been met (act 540). If the driver's deceleration demand has not been met, the braking controller 20 applies deceleration with the steer axle friction brakes (here, via a pneumatic or electronic signal to the steer axle brake circuit) (act 550). The braking controller 20 again determines if the driver's deceleration demand has been met (act 560). If the driver's deceleration demand has not been met, the braking controller 20 applies deceleration with the tractor's endurance brake (retarder) 110 (here, by sending signals to the endurance brake 110) (act 570). The braking controller 20 then determines if the driver's deceleration demand has been met (act 580). If the driver's deceleration demand has not been met, the braking controller 20 applies deceleration with the tractor's friction brakes on the driven axle 110 (here, by activating additive friction braking to the drive axle brake circuit) (act 590). When the requested deceleration is achieved, the vehicle comes to a stop (act 595).

As shown by this example, regenerative braking is used first, and the other braking circuits can be isolated and added without impact to the drive axle's regenerative braking system. Generally, these additional braking systems will be utilized in the order shown in FIG. 5, but a different order can be used. For example, a towing vehicle without a trailer may use the steer axle friction brakes to complete the driver's request.

Figure 7:
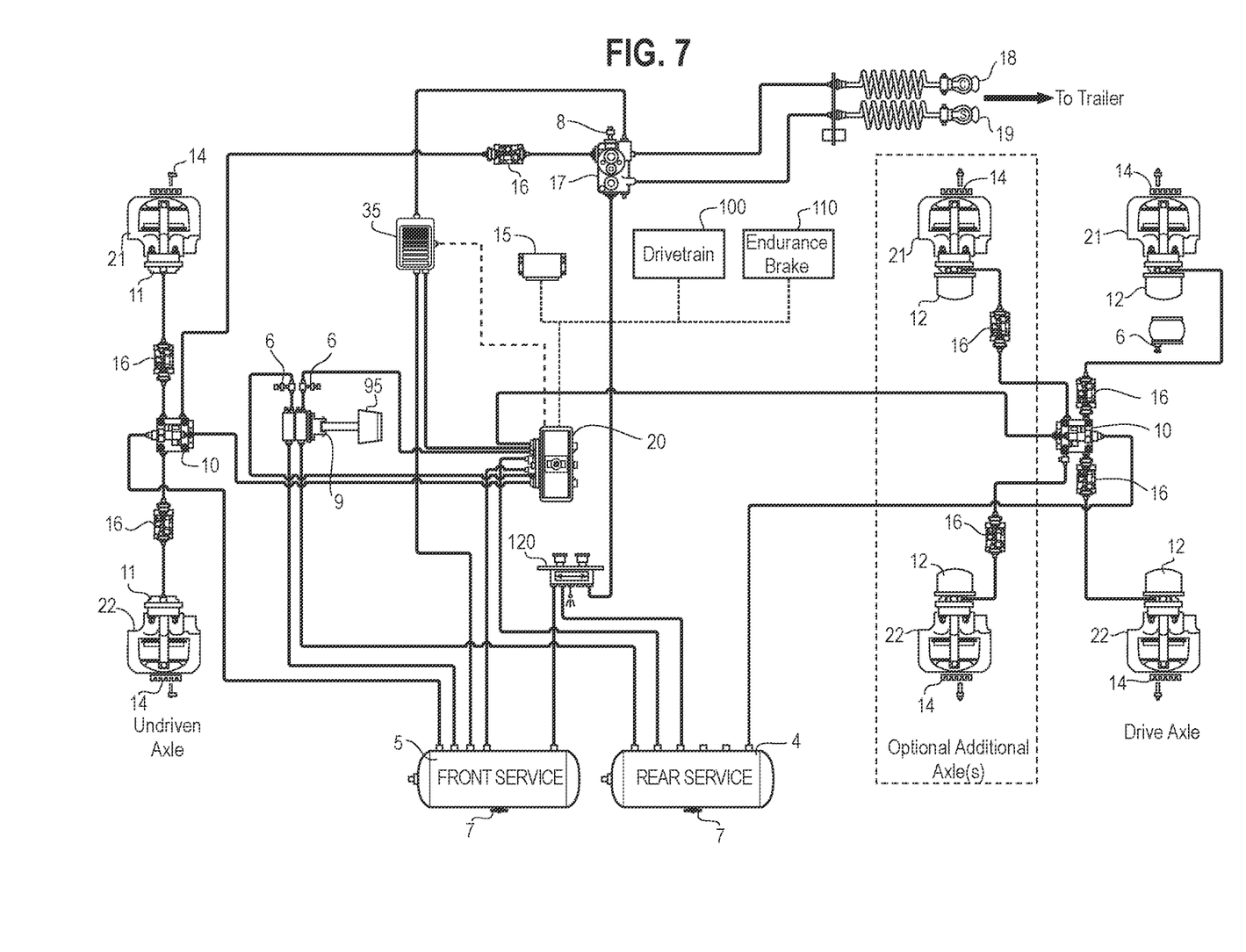
FIG. 7 is a diagram of a braking system of an embodiment comprising a single-channel electro-pneumatic valve to distribute a braking request between the braking system of the tractor and a braking system of a trailer.

In the embodiment described above, the braking system contained a solenoid-controlled valve 34 that was controlled by the braking controller 20 to control communication of pneumatic pressure generating by the application of the brake 95 to the brake system of the trailer. As mentioned above, other types of valves can be used, and FIG. 7 is an illustration of a braking system of another embodiment in which a single-channel electro-pneumatic valve 35 (e.g., an EPM3 valve) is used instead of the three-port, two-state (3/2) solenoid-controlled valve 34. As with the solenoid-controlled valve 34, the braking controller 20 can use the single-channel electro-pneumatic valve 35 to control communication of pneumatic pressure generated by the application of the brake 95 to the brake system of the trailer.

Any suitable implementation of the single-channel electro-pneumatic valve 35 can be used. For example, the valve 35 can be controlled via an electrical or pneumatic signal and may be controlled by a (micro-)processor on or off the vehicle. Also, the supply air to the valve 35 can be provided by the front service reservoir 5 or by the rear service reservoir 4, singularly. Alternatively, supply air to the valve 35 can be provided by the front service reservoir 5 and the rear service reservoir 4 redundantly with isolation, such as with a check valve (and, optionally, pressure protected at the reservoir(s)).

There are many alternatives that can be used with any of the embodiments discussed above. For example, in the embodiments discussed above, the actuation of the brake pedal 95 caused pneumatic pressure to be provided to the braking controller 20. In an alternate embodiment, an electrical signal including a request for deceleration is provided instead. Similarly, in other instances described above where pneumatic pressure was used (e.g., as an instruction to the trailer's braking system to apply braking), an electrical signal can be used instead. As yet another alternative, in addition to or instead of receiving a deceleration request from the brake pedal, a deceleration request can be received from the acceleration pedal in a "one-pedal braking" environment, where removal of pressure from the acceleration pedal signals a desire for deceleration. Accordingly, the term "pedal" does not necessarily mean a brake pedal or even a foot-operated device (e.g., the "pedal" can be actuated by a driver's hand). Also, while various types of valves were described above, it should be understood that a brake blending system can be designed to achieve the functions without the use of a valve as described above. For example, the brake controller can send a control signal (via a wired or wireless communication) to the brake system of the trailer to provide the communication that is provided via the pneumatic value. Further, while some of the above embodiments show the additional braking circuit being in a trailer attached to a tractor, in an alternate embodiment, the additional braking circuit is in the same vehicle as the primary braking circuit(s), such as when an articulated portion of a vehicle has its own braking capability.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A braking control system comprising:
 a valve configured to receive pneumatic fluid; and
 a processor in communication with the valve and configured to:
  receive a deceleration signal generated by movement of a pedal of a tractor having a driveline, wherein the deceleration signal represents a requested deceleration; and wherein an amount of regenerative braking needed to achieve the requested deceleration is available to be applied in the tractor;
  prior to causing regenerative braking to be applied, determine whether using the amount of regenerative braking to achieve the requested deceleration will, if applied, exceed a capability of one or more components in the driveline of the tractor to provide controlled braking; and
  in response to determining that using the amount of regenerative braking needed to achieve the requested deceleration will, if applied, exceed the capability of the one or more components in the driveline of the tractor to provide controlled braking:
   cause regenerative braking to be applied in an amount that does not exceed the capability of the one or more components in the driveline of the tractor to provide controlled braking; and
   activate the valve to allow at least some of the pneumatic fluid to be sent to a braking system of a trailer towed by the tractor as an additional braking circuit.

2. The braking control system of claim 1, wherein the valve comprises a solenoid-controlled valve that activates the additional braking circuit.

3. The braking control system of claim 1, wherein the valve comprises a single-channel electro-pneumatic valve that activates the additional braking circuit.

4. The braking control system of claim 1, wherein the processor is further configured to:

in response to determining that deceleration caused by the regenerative braking and the braking system of the trailer is less than the requested deceleration, apply a friction brake to a non-driven axle of the tractor.

5. The braking control system of claim 1, wherein the processor is further configured to:
in response to determining that deceleration caused by the regenerative braking and the braking system of the trailer is less than the requested deceleration, apply an endurance brake to an electric motor of the tractor.

6. The braking control system of claim 1, wherein the processor is further configured to:
in response to determining that deceleration caused by the regenerative braking and the braking system of the trailer is less than the requested deceleration, perform at least some of the following, in order, until the requested deceleration is achieved:
apply a friction brake to a non-driven axle of the tractor;
apply an endurance brake to an electric motor of the tractor; and
apply a friction brake to a driven axle of the tractor.

7. The braking control system of claim 1, wherein the deceleration signal comprises a pneumatic signal.

8. The braking control system of claim 1, wherein the deceleration signal comprises an electrical signal.

9. The braking control system of claim 1, wherein the braking system of the trailer comprises a pneumatic braking system.

10. The braking control system of claim 1, wherein the braking system of the trailer comprises an electro-pneumatic braking system.

11. The braking control system of claim 1, wherein the braking system of the trailer comprises a regenerative braking system.

12. The braking control system of claim 11, wherein the regenerative braking system of the trailer is configured to provide acceleration.

13. A method comprising:
performing the following in a controller of a towing vehicle that is coupled with a towed vehicle:
receiving a signal requesting deceleration, wherein an amount of regenerative braking needed to achieve the requested deceleration is available to be applied in the towing vehicle;
prior to causing regenerative braking to be applied, determining whether the amount of regenerative braking needed to be applied by an electric driveline of the towing vehicle to achieve the requested deceleration would, if applied, exceed a maximum deceleration capability of one or more components in the electric driveline to provide controlled braking; and
in response to determining that the amount of regenerative braking needed to be applied would, if applied, exceed the maximum deceleration capability:
causing the electric driveline to apply regenerative braking on at least one axle in an amount less than the maximum deceleration capability; and
implementing deceleration of the towed vehicle as an additional source of deceleration of a combination of the towing vehicle and towed vehicle.

14. The method of claim 13, further comprising in response to determining that regenerative braking and the deceleration of the towed vehicle are insufficient to achieve the requested deceleration, performing at least one of the following in order until the requested deceleration is achieved: applying a friction brake to undriven axle(s) of the towing vehicle, applying an endurance brake to the electric driveline, or applying a friction brake to the driven axle(s).

15. The method of claim 13, wherein the deceleration signal comprises a pneumatic signal.

16. The method of claim 13, wherein the deceleration signal comprises an electronic signal.

17. A system for a multi-axle vehicle comprising:
an electric motor configured to perform regenerative braking to decelerate a multi-axle vehicle; and
means for:
receiving a deceleration signal generated by movement of a pedal of the multi-axle vehicle having a driveline, wherein the deceleration signal represents a requested deceleration, and wherein an amount of regenerative braking needed to achieve the requested deceleration is available to be applied in the multi-axle vehicle;
prior to causing regenerative braking to be applied, determining whether using the amount of regenerative braking needed to achieve the requested deceleration will, if applied, exceed a capability of one or more components in the driveline of the multi-axle vehicle to provide controlled braking; and
in response to determining that using the amount of regenerative braking needed to achieve the requested deceleration will, if applied, exceed the capability of the one or more components in the driveline of the multi-axle vehicle to provide controlled braking:
causing regenerative braking to be applied in an amount that does not exceed the capability of the one or more components in the driveline of the multi-axle vehicle to provide controlled braking; and
activating an additional braking circuit.

18. The system of claim 17, wherein the means for distributing comprises a solenoid-controlled valve communicating with the additional braking circuit.

19. The system of claim 17, wherein the means for distributing comprises a single-channel electro-pneumatic valve communicating with the additional braking circuit.

20. The system of claim 17, wherein the additional braking circuit is on a trailer connected to the multi-axle vehicle.

* * * * *